United States Patent [19]
Baedke

[11] 3,809,349
[45] May 7, 1974

[54] CORD HOLDER
[76] Inventor: Dale E. Baedke, 2105 E. Maple St., Des Moines, Iowa 50317
[22] Filed: Aug. 17, 1972
[21] Appl. No.: 281,433

[52] U.S. Cl.............. 248/51, 224/5 A, 248/55, 248/215
[51] Int. Cl.............................................. F16l 3/00
[58] Field of Search........... 248/51, 52, 55, 215, 76, 248/78, 329, 332; 224/5 A, 5 B; 254/190 R, 190 A; 24/230.5 BA, 230.5 CS; 2/311, 312, 318

[56] References Cited
UNITED STATES PATENTS

| | | | |
|---|---|---|---|
| 2,386,708 | 10/1945 | Morrison | 2/312 |
| 928,006 | 7/1909 | Thomas | 248/304 X |
| 2,504,005 | 4/1950 | Davis | 248/51 X |
| 230,701 | 8/1880 | Haviland | 248/215 |
| 1,164,928 | 12/1915 | Corcoran | 248/51 |
| 3,718,241 | 2/1973 | Forsythe | 224/5 A |
| 2,602,575 | 7/1952 | Olson | 224/5 B |
| 2,388,811 | 11/1945 | Zatko | 224/5 A |
| 2,261,046 | 10/1941 | Anderson | 248/51 |
| 1,522,684 | 1/1925 | Howard | 248/51 X |
| 1,614,393 | 1/1927 | Robinson | 248/51 |
| 2,606,733 | 8/1952 | Krajewski | 248/215 |
| 415,896 | 11/1889 | Bradner | 248/329 |

FOREIGN PATENTS OR APPLICATIONS
302,776  12/1928  Great Britain ............ 248/215

Primary Examiner—Roy D. Frazier
Assistant Examiner—Rodney H. Bonck
Attorney, Agent, or Firm—Morton S. Adler

[57] ABSTRACT

An electric cord supporting device or holder for use with manually operated equipment such as power tools, vacuum sweepers, electric lawn mowers and the like. This device embodies a hook or bracket type support through which the cord can be trained or reeved to keep it from dragging or becoming entangled with the mechanism to which it is attached or the workpiece involved or with the operator using the mechanism and is adapted in different embodiments to be worn on the operator's arm or belt or to be detachably or fixedly secured to a stationary support. A roller is preferably provided for engagement by the cord to facilitate the travel of the cord through this support or holder as the movements of the operator require.

2 Claims, 6 Drawing Figures

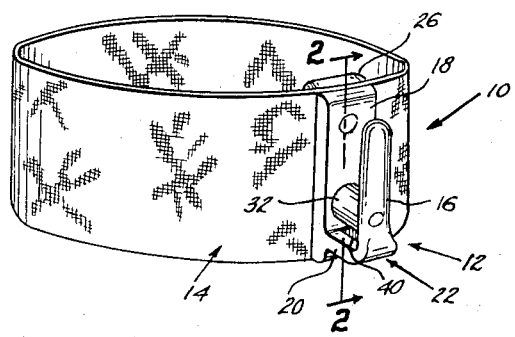
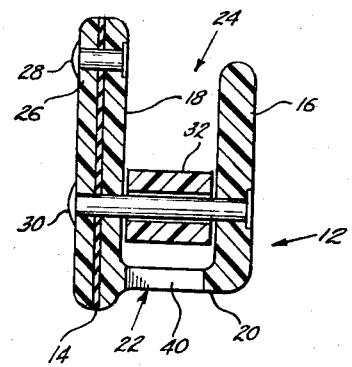
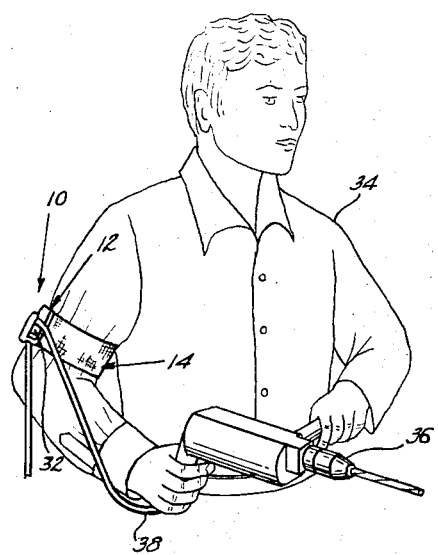
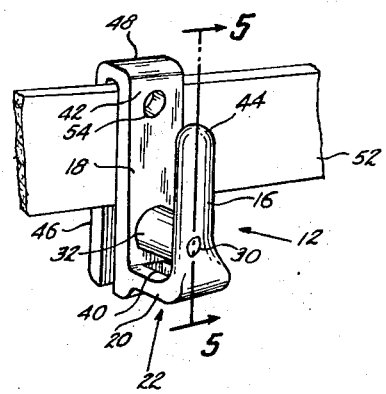
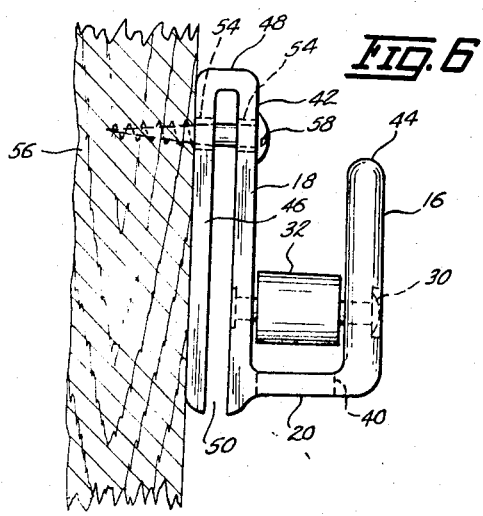
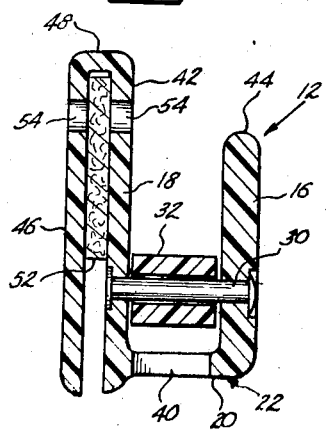

CORD HOLDER

BACKGROUND OF THE INVENTION

This invention relates to a holder for supporting an electric cord on manually operated power equipment and appliances and is preferably designed to be worn by the operator although it is not intended to be limited to that form of use.

In the use of portable power tools such as saws, drills, routers and sanders and with equipment such as electric lawn mowers, vacuum sweepers and the like, the operator must of necessity contend with electric cords of varying lengths depending upon the particular tool or appliance. The moving about of the operator or of the tool or appliance as the work is done causes a corresponding shifting of the relative position of the cord with the result that the cord either accidently or inadvertently becomes entangled either with the tool, the work or the operator and cannot only interrupt the work but can be, and frequently is, cut or damaged.

While some equipment such as the vacuum sweeper provides means on the handle for keeping the cord wound up, it is highly inconvenient to continually unwind and wind the cord as more or lesser lengths are required and to hold excess cord length in one's hand for release or takeup as needed interfers with the efficient use of those type of tools where both hands are required or generally used.

So far as can be determined, it does not appear that any attention has previously been directed to the problem outlined and, accordingly, the principal object of this invention is to provide a holder for the electric cord on manually operated power tools and appliances which will permit the unrestrained use of the cord throughout its working length and at the same time keep such cord from becoming entangled with the tool, with the work or with the operator.

A further object herein is to provide a cord holder as characterized which may conveniently be worn on the person of the operator or, if desired, may be detachably or fixedly arranged on a stationary support.

Still another object of this invention is to provide a cord holder of the above class which supports the cord at a conveniently spaced point exteriorly of the tool and which permits the cord to easily travel or move relative thereto as the circumstances require.

SUMMARY

This invention provides a holder or support for the electric cord on a power tool or the like and preferably is in the form of a relatively narrow elongated U-shaped hook or bracket. In one embodiment, the bracket carries an elastic band to be conveniently worn on the arm of the user whereby the cord is supported by being trained or reeved through the lower closed U portion of the bracket. In a second embodiment, one side of the U-shaped bracket is provided with an integral inverted U-shaped closely spaced parallel arm which defines a clip capable of being engaged with a user's belt. Preferably, a roller means is disposed within the lower closed end of the bracket to be engaged by the cord and to facilitate its movement relative thereto in respective opposite directions as the movements of the operator and the changing positions of the cord may require. Such holder, in a third embodiment, is also adapted to be either detachably or securely affixed to a stationary support in close proximity to the location of work such as a wall mounted nail, hook, screw or similar support.

The several objects of this invention together with the general details outlined and the advantages of the same will be more fully described in relation to the more detailed description of the accompanying drawings.

BRIEF DESCRIPTION OF THE DRAWINGS

FIG. 1 is a perspective view of a preferred embodiment of this invention,

FIG. 2 is a sectional view taken on the line 2—2 of FIG. 1,

FIG. 3 is an illustration of this invention as shown in FIG. 1 being used for the electric cord of a power drill and being worn on the arm of the person using the tool, FIG. 4 is a perspective view of a second embodiment of this cord holder shown attached to a support such as a person's belt or the like and being also shown with a transverse hole which defines a third embodiment by which it can be detachably or securely affixed to a suitable support, FIG. 5 is a sectional view taken on the line 5—5 of FIG. 4, and FIG. 6 illustrates the third embodiment mounted to a wall support.

DESCRIPTION OF THE PREFERRED EMBODIMENTS

Referring to the drawings, this invention in its preferred embodiment is designated generally by the numeral 10 in FIG. 1 and includes the combination of an electric cord holder 12, to be used with the cord on power tools or appliances as will appear, and a measn for supporting such holder which in FIG. 1 is shown in the form of an elastic arm band 14.

Cord holder 12, which may be of any suitable material such as wood, metal, plastic or the like, is generally U-shaped defined by the parallel spaces sides or arms 16 and 18 which are integrally connected at one end by the crosspiece 20 and for purposes of description, the end defined by such crosspiece 20 is designated as the closed end 22 with the opposite end being referred to as the open end 24. An endless elastic arm band 14 is secured in any suitable manner to side or arm 18 so as to extend therefrom as shown and for this purpose, I have preferably used a third side 26 which is complementary to side 18 and in juxtaposition therewith with a portion of band 14 being secured intermediate sides 18 and 26 such as by the pins or rivets 28 and 30 or the like. It will, of course, be appreciated that band 14 can be secured directly to side 18 but the manner shown including side 26 provides a secure clamp-type attachment designed for efficient use.

Within the lower portion of holder 12 intermediate sides 16 and 18 and slightly spaced above the crosspiece 20, I have preferably provided a roller member 32 having an axis transversely of the longitudinal plane of holder 12 and which is mounted for rotation on the pin or rivet 30. Such pin as shown serves also to secure side 26 to side 18 and has been made elongated for attachment to side 16 to support the roller member 32 as described. In this regard, however, it will be understood that if band 14 is secured to side 18 without utilizing side 26, pin 30 will extend between sides 18 and 16 to support roller member 32.

Thus far described, the use of cord holder 10 as shown in FIGS. 1 and 2 is best illustrated by reference to FIG. 3 where there is shown an operator 34 using a power drill 36 from which there extends the customary electric cord 38. Holder 10 is detachably arranged on the person of the operator 34 by slipping the elastic band 14 onto the operator's arm as shown with the closed end 22 of the holder 12 oriented toward the tool 36 and the open end 24 oriented away from the tool. The cord 38 is then trained through holder 12 intermediate sides 16 and 18 so that it is in effect reeved over the roller member 32. Sides 16 and 18 will serve adequately to confine the cord 38 within holder 12 and as the operator 34 may move about using the drill 36, cord 38 will be supported in holder 12, kept free of entanglement with the operator 34 and the movement of the cord 38 relative to holder 12 will be facilitated by the lack of friction afforded by roller member 32. To assure that the free rotation of roller member 32 will not be prevented by the chance lodging of any drill or saw chips or the like, crosspiece 20 is provided with the through opening or slot 40 directly beneath the roller 32.

While cord holder 10 is shown in FIG. 3 as mounted on the upper arm of the operator 34, this is not required and some persons may prefer to place holder 10 on the forearm depending upon the type of tool and place of work. In addition, it may be desirable for an operator to place a holder 10 on each arm whereby the cord 38 can be shifted between the two holders as the situation may require. The use of cord holder 10 as described may be advantageously used with all types of power tools such as sanders, routers, drills and the like and including such appliances and machines as vacuum sweepers, electric lawn mowers and any similar device where care of an electric cord is a problem.

Reference is now made to FIGS. 4 and 5 where I have shown a second and third embodiment of this invention and where like parts to those previously described are given like numerals. The structure, purpose and use of holder 12 as seen in FIGS. 4 and 5 are the same as previously described and the modifications to be described are to provide only for the placement and support of holder 12 in a manner different from attachment with band 14, if desired.

As a second embodiment, side 18 is somewhat elongated so that its upper end portion 42 extends above the plane of the top end 44 of side 16 and, as will appear, this also serves to accommodate the third embodiment. A third side 46, corresponding in relative location to side 26 of FIG. 2, is disposed in relatively closely spaced parallel relationship to the outer surface of side 18 and integrally attached to side 18 at their upper ends by crosspiece 48 so as to form a clip 50 closed at the top and open at the bottom in reverse relationship to the open end 24 and closed end 22 of holder 12. By this arrangement, clip portion 50 may be suitably frictionally slipfitted over a support 52 which may be the belt of the operator 34 or which may be a bar or bracket located elsewhere than on the person of the operator. Similarly, for purposes of attachment of holder 12 away from the person of the operator 34, I have for purposes of the third embodiment, placed a transverse opening 54 through sides 18 and 46 in the upper portion 42 thereof whereby such holder 12 can be detachably affixed to a hook, nail or the like or, as shown in FIG. 6 can be fixedly secured to a wall 56 by means of a screw 58 in which case the location of hole 54 above the plane of the top 44 of side 16 affords easy access for use of any necessary tool such as a screwdriver or the like.

Accordingly, from all of the foregoing, it is thought that a full and complete understanding of the construction and use of this cord holder will be had and its advantages appreciated.

I claim:
1. As a new article of manufacture, the combination of:
   a support member for the electric cord on a manually manipulated power tool or like apparatus, comprising,
      first and second parallel spaced side members,
      a crosspiece connected to said side members at one end thereof to define the closed end of a U-shaped cord support,
   means carried by said support member to permit of its mounting to an anchor point in spaced relationship to the tool but in relatively close proximity to the place of use, comprising,
      a third side member disposed in juxtaposition to said second side member,
      an arm band having a portion thereof disposed intermediate said second and third side members,
      fastening means securing said second and third side members together and in clamping engagement relative to said arm band,
   a roller member rotatably arranged intermediate said first and second side members in close spaced relationship above said crosspiece, and
   said crosspiece being provided with a through opening directly below said roller member.
2. A device as defined in claim 1, including:
   a pin extended through said first, second and third side members,
   said pin being axially journalled through said roller member to support the same, and
   said pin also serving as a second fastening means for securing said second and third side members together and in clamping engagement relative to said arm band.

* * * * *